Feb. 16, 1965
D. A. CASE
3,170,111
CONDUCTIVITY TEST CELL WITH AUTOMATIC COMPENSATION
FOR SAMPLE TEMPERATURE
Filed Sept. 15, 1961
2 Sheets-Sheet 1
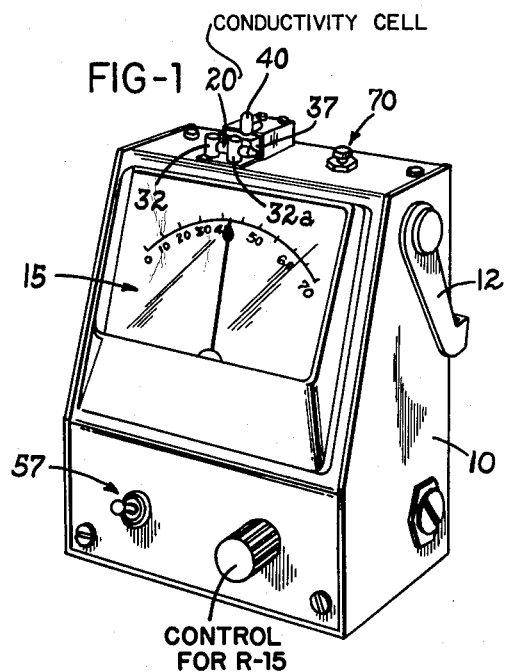
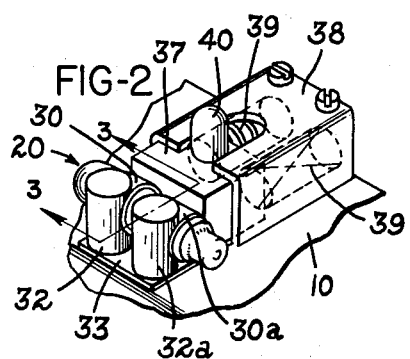
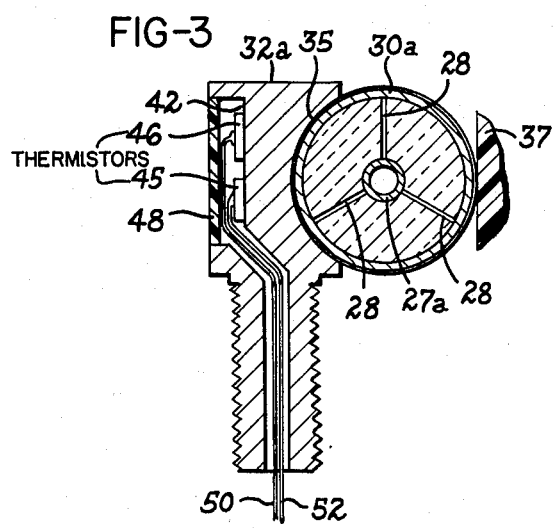
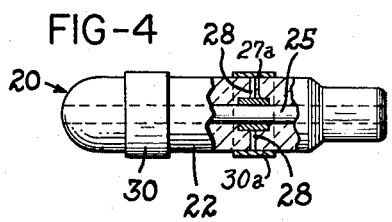
INVENTOR.
DAVID A. CASE
BY
Marechal, Biebel, French & Bugg
ATTORNEYS United States Patent Office 3,170,111
Patented Feb. 16, 1965

3,170,111
CONDUCTIVITY TEST CELL WITH AUTOMATIC COMPENSATION FOR SAMPLE TEMPERATURE
David A. Case, Yellow Springs, Ohio, assignor to The Yellow Springs Instrument Company, Inc., Yellow Springs, Ohio, a corporation of Ohio
Filed Sept. 15, 1961, Ser. No. 138,449
3 Claims. (Cl. 324—30)

This invention relates to a test instrument, particularly such an instrument adapted for testing a response characteristic of material to electric current flow therethrough, and in particular to such instruments used to determine an hematocrit.

In such instruments, referring to the hematocrit meter as a typical example, it is possible to determine the same condition of a sample of material, such as a sample of blood, by determining the conductance characteristic thereof to flow of an electric current and comparing this condition of the sample with known or expected values or standards. However, it is possible with many materials, and blood samples of which an hematocrit is desired are one example, that the electric current flow transmission characteristics of the sample may vary somewhat with temperature of the sample and in order to obtain a standardized reading it is desirable to avoid in the test circuit and test equipment variances which may result from testing of samples having different temperatures. The present invention provides a manner for compensating for temperature differences, thereby eliminating temperature changes as an effective variable in the measurement.

In order to accomplish this purpose, the invention employs a resistor which exhibits changing electrical resistance characteristics with changes in temperature, such devices normally being known in the art as thermistors. The thermistor is mounted as close as possible to the sample of material of which the test is being made, and a thermal conductive path of low resistance to heat transmission is provided between the thermistor and the sample, thus obtaining an effective temperature of the thermistor which is closely allied to the temperature of the sample. The thermistor is incorporated in the test circuit in such a way as to provide a compensation for changes in temperature, thereby eliminating this change as a part of the conductance response.

Accordingly, the primary object of this invention is to provide a novel instrument for testing the electrical conductivity of material samples, in which there is a compensation incorporated for thermal changes or differences in the sample from known or expected values.

Another object of the invention is to provide a novel hematocrit meter in which there is an automatic compensation for the temperature of the blood sample.

An additional object of the invention is to provide a novel cell for conductivity testing which incorporates paths of relatively low thermal resistance, as well as a path for the flow of electrical current through a sample contained in the cell, to afford a thermal balance path between the sample in the cell and a temperature sensitive device exterior of the cell.

Other objects and advantages of the invention will be apparent from the following description, the accompanying drawings and the appended claims.

In the drawing—

FIG. 1 is a perspective view of an instrument, in this particular case an hematocrit meter, incorporating the present invention;

FIG. 2 is a perspective view on an enlarged scale of the mounting for the conductivity cell;

FIG. 3 is a sectional view on a substantially larger scale, taken on the line 3—3 of FIG. 2;

FIG. 4 is an enlarged view, with parts broken away and shown in section, of a typical conductivity test cell in accordance with the invention.

Figure 5:
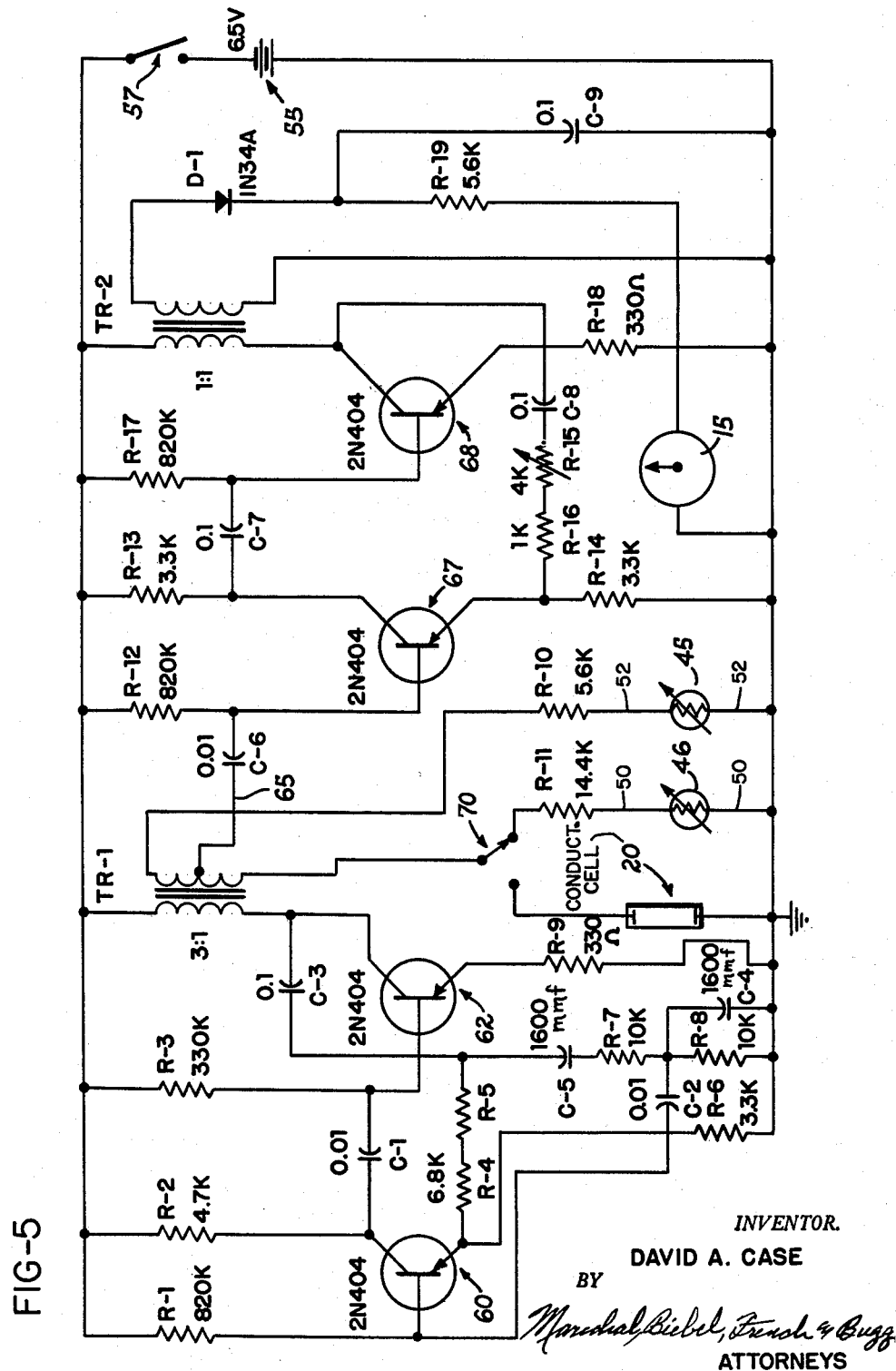
FIG. 5 is a schematic electrical diagram of an hematocrit meter incorporating the features of the present invention.

Referring to the drawing, which illustrates one preferred embodiment of the invention, the instrument is shown as incorporated in a portable case or housing 10 having a carrying handle 12, and incorporating the meter 15 in the front face thereof. On the top of the case there is a mounting for a conductivity cell indicated by the general reference numeral 20.

Details of the cell are shown in FIGS. 3 and 4, and include a glass or similar non-electrically conductive body 22 having a central passage 25 which forms the test cavity or chamber for receiving a blood sample, in the case of an hematocrit meter, or in the case of some other conductivity testing meter a typical sample of material, having or exhibiting a known or standard conductivity characteristic. At spaced locations in the passage or cavity 25 there are terminals including contact rings 27, 27a, one of which is seen in FIG. 3, preferably formed of platinum. These are connected through radially extending metallic pins 28, or a material which is a good conductor both of electricity and of heat, to outer or external contact rings 30, 30a, which are mounted on the exterior of the cell. In one preferred embodiment these outer rings are of gold plated brass. It is important that the inner and outer contact rings and the connecting ends or like members, which form the terminals, be good conductors, both thermally and electrically, so that their resistance to transmission of heat and electrical curent is insignificant in the circuit.

On the top of the case 10 there are spaced contact members in the form of posts 32 and 32a which are mounted on an insulating base 33, and which include concave face portions 35 (FIG. 3) which are of a contour suitable to receive the contact rings 30 and 30a of the cell. The cell is maintained tightly against these posts by a pressure block 37 of insulating material which is slidably mounted in a box 38, and forced against the inserted cell by the springs 39. A stud or pin 40 forms a convenient handle to move the block away from the cell for insertion and removal thereof.

One of the contact posts, for example the post 32a, is provided with a hollow or cavity 42 containing a pair of thermistors 45 and 46 which are soldered or otherwise secured to the metal body of the post, and covered by any suitable means, such as a filling of an epoxy resin 48 or equivalent. Thermistor 45 is provided with insulated lead wires 50 (shown as a single insulated connection incorporating separate individual wires) extending through the base of the contact post, and thermistor 46 has separate insulated lead wires 52 (also shown as an integral connecting lead incorporating separate conducting wires) also extending through the base of the post. These lead wires pass to the interior of the casing 10, where they are connected into the circuit shown schematically in FIG. 5.

FIG. 5 is a schematic diagram of a circuit for determining an hematocrit by an electrical conductivity test, and in which the compensating features provided by this invention have been incorporated. It should be understood, however, that the invention is not limited to hematocrit testing, but is applicable to other types of conductivity testing devices. The instrument preferably is completely portable, and thus power is supplied by a self-contained battery 55 and its connection into the circuit is controlled by the off-on switch 57. When the switch is closed power is supplied to an oscillator, including the transistors 60 and 62 and connected circuits as shown, which serves to energize the test circuit through the transformer TR-1, specifically by applying a higher frequency A.C. potential (for example 10 k.c.) across the primary winding of this transformer. The secondary winding includes a center tap which is connected to the test circuit output line 65, and the opposite sides of the secondary winding, together with the test cell 20 on one side, and the series connected resistor R-10 and thermistor 45 on the other side, form a bridge circuit, the unbalance of which will be related to the conductivity of the material in the cell.

It should be noted that the thermistor 45 is, by reason of its mounting and the low resistance thermal path provided in the cell, maintained at essentially the same temperature as the material in the cavity of the cell. Therefore, any variation in conductivity of the material being tested due to its temperature is compensated by the fact that thermistor 45 is at essentially the same temperature in an opposite leg of the bridge circuit. If the material being tested and the thermistor has opposite thermal-electrical resistance change characteristics, then of course the thermistor could be connected into the same leg as the cell, or a diametrically opposed leg, to obtain the desired compensation.

The output from line 65 is directed through condenser C-6 to a two stage amplifier including the transistors 67 and 68 and their connected circuitry, which serve to amplify the output signal from the test circuit and apply the amplified signal across the primary winding of the output transformer TR-2. The secondary winding of this transformer is connected through diode D-1 and resistor R-19 to the meter 15, and thus the rectified signal is applied to the meter, which may be in the form of an ordinary D.C. galvanometer with an appropriate scale, for observation or recording.

The test circuit also includes the resistor R-11 and thermistor 46 which are series connected and in parallel with the test cell 20, the switch 70 providing a means for connecting one or the other of these circuits into the same arm of the bridge circuit. The switch 70, when moved to the contact which connects the thermistor 46 in the circuit, is in a calibrating position, at which the thermistors 45 and 46, both being mounted in the post, balance each other. The value of R-11 is so selected with respect to the value of R-10 that a known unbalance will result in the bridge circuit. At this time, the potentiometer R-15 can be adjusted in the amplifier circuit to regulate the gain of the amplifier appropriately to obtain a predetermined meter reading. This arrangement provides a convenient way of calibrating the meter prior to making an actual conductivity test.

The function of the device will be otherwise obvious to those skilled in the art. For example, when determining an hematocrit, a blood sample is placed in the cavity 25 of the cell in sufficient quantity to cover the inner contact rings 27, and the cell is placed in its mounting, against the posts 32 and 32a. The meter is calibrated if necessary, and then with switch 70 connecting the cell 20 in the test circuit and the switch 57 closed, the circuits are energized to obtain the conductivity test reading.

Of course, as previously mentioned, the invention is not confined to apparatus for determining an hematocrit, but rather has general application in the testing of materials which have predetermined conductance of electric current. Thus, it is possible to test solids, or semi-solids, which by their nature could be self-supporting across the contact posts, and thus would not require the use of a cell to form both the electrical and thermal conductive paths from the material being tested to the posts. In this instance, of course, with the material being tested directly contacting that post in which the thermistors are mounted, the post itself will provide the heat flow path of low thermal resistance which is a feature of the invention.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. Apparatus for determining a hematocrit comprising a test cell having a pair of spaced terminals including contacts extending from the interior to and beyond the exterior of said cell to define external contacts and a chamber on the interior of said cell for holding a blood sample between and in contact with said terminals whereby electrical current can be passed through such blood sample between said terminals, at least one of said terminals being constructed of material forming a path of low resistance both to thermal and electric current flow, mounting means for said cell including contact members spaced to engage said external contacts of said cell, means normally holding said cell in said mounting means and arranged to permit withdrawal of said cell therefrom, a thermistor contacting that one of said mounting means which is arranged for contact with said one terminal on said cell providing for heat transfer between a sample in said cell and said thermistor through a path of low thermal resistance, an electric testing circuit connected to said contact members and incorporating a source of electrical energy operative to flow an electric current through said contact members and said terminals on said cell and through a sample in said cell, means incorporated in said testing circuit for measuring the quantity of electric current passing through a sample in said cell for testing electrical conductance response of a blood sample and connections between said thermistor and said testing circuit providing for compensation of the current flow sensed by said measuring means according to the thermal condition of a sample in said cell as determined by the corresponding thermal condition of said thermistor.

2. In apparatus for testing a sample of material by determining the conductivity thereof to an electric current flow, a test cell including a test cavity for holding the sample, spaced contacts forming two separate electrical flow paths from the exterior of said cell to said cavity, means forming a path of low heat flow resistance from said cavity to the exterior of said cell, mounting means for said cell including spaced contact posts and a member for holding said cell against said posts with said contacts engaged with respective said posts, a bridge circuit including connections to said posts for incorporating the cell in one arm of said circuit, a thermistor mounted in one of said posts and in direct communication with said means forming a heat flow path, means connected to apply a potential difference to said circuit for causing current flow through a sample in said cell, a meter connected to indicate an unbalance in said circuit related to the conductance of material in said cell, and means connecting said thermistor into said circuit in such relation to said contact post connections that changes in resistance of a sample in said cell due to thermal changes are compensated by corresponding resistance changes of said thermistor.

3. In apparatus for testing a sample of material by determining the conductivity thereof to an electric current flow, the combination of spaced contact members forming two separate electrical flow paths through which a circuit may be completed by a sample of the material to be tested, said contact members being mounted to form a gap across which the material to be tested can be positioned, a bridge circuit including connections to said contact members for incorporating the material connected therebetween in one arm of said circuit, a thermistor mounted in one of said contact members and in direct heat exchange communication through said one contact member with the material being tested to maintain during testing a substantially balanced temperature of the material and the thermistor, means connecting said thermistor into an arm of said circuit, means connected to apply a potential difference to said circuit for causing current flow through the sample of material positioned across said contact members, and means for indicating an unbalance in said circuit related to the conductance of the material being tested and compensated for the thermal condition of such material.

References Cited in the file of this patent
UNITED STATES PATENTS

| | | |
|---|---|---|
| 1,479,087 | Rice | Jan. 1, 1924 |
| 2,505,936 | Behn | May 2, 1950 |